United States Patent [19]

De Bruine

[11] 4,003,445
[45] Jan. 18, 1977

[54] CODE CIRCUITRY FOR A VEHICLE GUIDANCE MECHANISM

[75] Inventor: Carl De Bruine, Grand Rapids, Mich.

[73] Assignee: Lear Siegler, Inc., Santa Monica, Calif.

[22] Filed: Feb. 12, 1976

[21] Appl. No.: 657,447

[52] U.S. Cl. .............................. 180/98; 250/202; 250/214 AG; 318/587
[51] Int. Cl.² ........................................ B62D 1/28
[58] Field of Search ............ 180/98, 79.1; 250/202, 250/214 AG, 219; 318/587; 246/182, 187

[56] References Cited

UNITED STATES PATENTS

| | | | |
|---|---|---|---|
| 2,074,251 | 3/1937 | Braun | 180/79.1 |
| 2,803,743 | 8/1957 | Ballerait | 180/98 X |
| 2,883,559 | 4/1959 | Bailey | 250/202 |
| 2,996,137 | 8/1961 | Chu | 180/98 |
| 2,996,621 | 8/1961 | Barrett | 250/202 |
| 2,999,938 | 9/1961 | Hann et al. | 250/202 |
| 3,017,946 | 1/1962 | Davis | 180/98 |
| 3,527,953 | 9/1970 | Chitayat | 250/219 |
| 3,718,821 | 10/1971 | Vischulis | 250/202 |
| 3,744,586 | 7/1973 | Leinauer | 180/79.1 |

*Primary Examiner*—Philip Goodman
*Assistant Examiner*—Terrance L. Siemens
*Attorney, Agent, or Firm*—McGarry & Waters

[57] ABSTRACT

Code circuitry for controlling the operation of a vehicle that is guided along a guide line by means of a vehicle guidance mechanism comprises a plurality of code markers positioned in a code marker path alongside the guide line, a sensor circuit that senses the intensity of radiation received from the guide line and code marker path and generates a code signal whenever the radiation from the code marker path increases to a predetermined proportion of the intensity of the radiation received from the guide line, and a control mechanism that controls the operation of the vehicle in response to code signals generated by the sensor circuit. A gain control feedback mechanism provides gain adjustment for wide variations in guide line and code marker intensity, and modulation circuitry eliminates the effect of static background radiation. A first delay circuit prevents transmission of a code signal unless the duration of the signal received by the sensor circuit is of a length to indicate the presence of a genuine code marker. A second delay circuit prevents transmission of the code signal until a predetermined interval after the first code marker is passed. The control mechanism stops the vehicle permanently if a second code marker signal is present when the second interval terminates. The control mechanism stops the vehicle temporarily and then automatically starts the vehicle again after a predetermined time period if no code marker signal is present after the second interval terminates. A line detection circuit prevents transmission of a code signal when the vehicle is not following the guide line.

18 Claims, 9 Drawing Figures

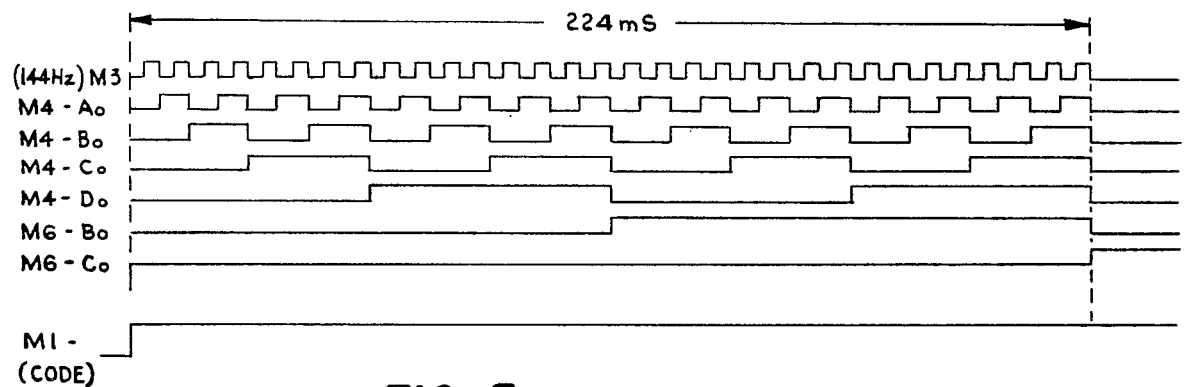
FIG. 5
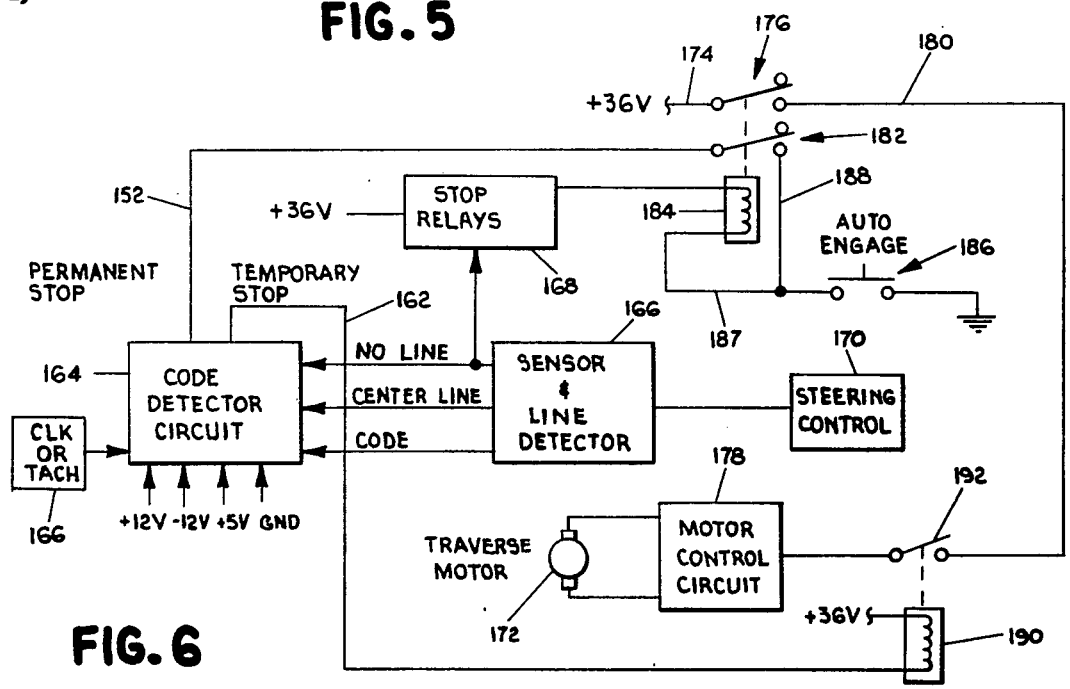
FIG. 6
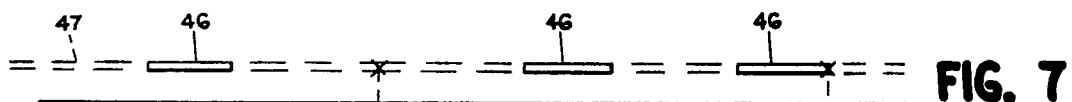
FIG. 7
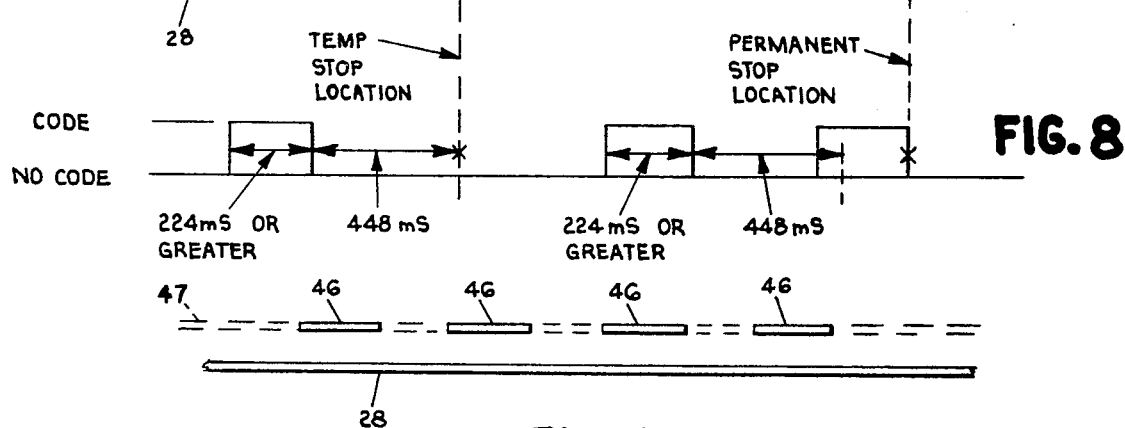
FIG. 8
FIG. 9

CODE CIRCUITRY FOR A VEHICLE GUIDANCE MECHANISM

BACKGROUND OF THE INVENTION

1. Field of the Invention

This invention relates to a line tracking system for automatically directing a vehicle along a predetermined path and more particularly to code circuitry for controlling the operation of the vehicle as it moves along the guide line.

2. Description of the Prior Art

A variety of automatically controlled devices for vehicles have been developed. One particularly advantageous type of vehicle control mechanism is disclosed in co-pending U.S. patent application, Ser. No. 489,043, filed July 16, 1974 now U.S. Pat. No. 3,935,922. The control circuitry for this vehicle is described also in applicant's co-pending U.S. patent application Ser. No. 488,961, filed July 16, 1974 now U.S. Pat. No. 3,970,840. Both applications are owned by the same assignee as the present application. The present invention comprises code circuitry for controlling the operation of a vehicle as it is guided along the guide path and is used in connection with the vehicle guidance mechanism disclosed in the foregoing patent applications. For purposes of the present application, the drawings and descriptions of the guidance mechanism in these patent applications are hereby incorporated by reference. These patent applications will hereinafter be referred to as the "Related Applications".

Heretofore, a variety of code sensing devices have been employed for controlling the stopping and starting of other operations of an automatically controlled vehicle along a guide line or guide path. In Wesener U.S. Pat. No. 3,628,624, magnetic markers are used to route a vehicle as it approaches a junction in a guide path, with the vehicle being programmed prior to reaching the junction and the selected branch followed in accordance with the programming and signal received. In Hamilton U.S. Pat. No. 2,520,680, a code marker deposited in a plowed field indicates the location where a seed is to be deposited by a corn planter. In Braun U.S. Pat. No. 2,074,251, a code adjacent a guide line is used to provide visible or audible signals to the driver of the vehicle. In Kohls U.S. Pat. No. 3,411,603, a code signal is generated by magnets implanted adjacent the guide line. In Sampey U.S. Pat. No. 3,642,087, speed and position of a vehicle are controlled by counting diamond-shaped patterns forming a guide line. In Saunders et al U.S. Pat. No. 3,218,461, black dots on a white guide line are employed to mark distinct positions along the guide line. In Rabinow et al U.S. Pat. No. 3,172,496, a tuned circuit is employed for detecting code information in a video signal. In Kubo U.S. Pat. No. 3,738,443, the operation of a vehicle along a guide path is controlled by a series of equally spaced electrical or optical signals which are counted and compared to a reference count for controlling vehicle operation. Paulus et al U.S. Pat. No. 2,317,400 discloses a wire following system wherein the guide line is displaced to the side of the guide path at positions along the guide path to activate coding pickup cells.

In capacitive, inductive, or magnetic systems, the code markers are of distinctive character and not easily misrepresented by random surface irregularities or background radiation. However, in an optical tracking system, there may be sufficient reflectance or fluorescence in random areas adjacent the guide line that could be interpreted as a code marker. This is particularly true for high performance optical tracking systems that are designed to follow extremely bright to extremely dim guide lines, such as the guide lines employed in the Related Applications, where guide line intensity can vary by three orders of magnitude or more.

In most code marking systems, the presence of a code marking signal is determined by the increase in the intensity of code radiation received by a code sensor when the code sensor passes over a code mark. This type of system essentially operates on the basis of a comparison of the amount of code radiation present in the background surface and in the code marker. No means are provided to adjust the gain of the code cell to compensate for differences in code marker radiation intensity or in contrast between the code marker and the background. The only way in which such a system can detect dim lines or poor contrast conditions is to maintain an extremely high code cell gain at all times, and this high gain increases the probabilities of actuation of a code signal through random or spurious signals received by the code cell.

It is one object of the present invention to provide a code circuitry mechanism that can effectively detect a code marker even though the intensity of radiation received from the code marker may vary widely over several orders of magnitude, while at the same time limiting gain to the extent possible in order to prevent the production of code signals by spurious sources.

Another object of the present invention is to provide a code circuit that discriminates between valid code marker signals and any spurious signals that are detected to ensure that no operational signals are produced by the spurious signals.

SUMMARY OF THE INVENTION

The present invention comprises a code circuit for automatically controlling operation of a vehicle employing a vehicle guidance mechanism that guides the vehicle along a guide line. In accordance with the present invention, the code circuitry comprises code markers positioned alongside the guide line at predetermined positions along the guide line where control functions are desired. The code markers are positioned approximately the same specified distance from the guide line such that the code markers are generally in alignment in a code marker path alongside the guide line. The code markers are formed such that code marker radiation is transmitted by the code markers at least at a specified time when the vehicle is passing the code marker. The code markers are formed such that the intensity of the code marker radiation has a generally fixed proportional relationship to the intensity of the guide line radiation from the portion of the guide line adjacent to the code marker.

The code marker radiation is detected by a sensor circuit in the vehicle. The sensor circuit senses and continuously compares the intensity of radiation received from the code marker path and guide line. When the intensity of the radiation received from the code marker path increases to a predetermined proportion of intensity of the guide line radiation such that the presence of a code marker in the code marker path is indicated, the sensor circuit generates a control signal. A control circuit receives the code signal generated by the sensor circuit and controls the operation of the vehicle in a predetermined manner.

An important feature of the present invention is the incorporation of a feedback mechanism for continuously adjusting the gain in the sensor circuit to compensate for variations in guide line brightness. The feedback mechanism increases sensor circuit gain when line brightness is low and decreases sensor circuit gain in the presence of a bright guide line. The guide line and code marker brightness are generally comparable at any given location along the line. Therefore, gain adjustment corresponding to variations in guide line brightness and contrast and actuation of the sensor circuit by a comparison between guide line and code marker signals results in an effective gain adjustment mechanism of the code circuitry.

The sensor circuit of the present invention comprises a code sensor for sensing radiation received from the code marker path and a guide line sensor for sensing radiation received from the guide line. The code sensor generates a code sensor output signal representative of the intensity of the radiation from the code marker path, and the guide line sensor generates a guide line sensor output signal representative of the intensity of the radiation from the guide line. A comparator amplifier compares the code sensor and guide line sensor output signals and generates a code signal whenever the code sensor output signal increases to a predetermined percentage of the guide line sensor output signal.

A modulation circuit prevents static background radiation from affecting the operation of the code circuitry.

In the preferred practice of the present invention, the sensor circuit includes sensor means for producing discreet output signals representative of guide line radiation intensity at at least three positions relative to the guide line, two positions being to the left and the right of the guide line and the third position being centered with respect to the guide line when the sensor means is positioned over the guide line. The guide line sensor output signal that is compared with the code sensor output signal is the output signal from the center position. The feedback signal is such that it maintains a constant difference between the output signals from the center position and the average of the left and right positions when the guide line is centered with respect to the sensor means and the intensity of the guide line radiation is greater than the intensity of the background radiation received by the sensor. Preferably, the center position output signal employed in the feedback mechanism is modified by adding to it the absolute value of the difference between the output signals from the left and right positions.

Another important feature of the present invention is the incorporation of a safety mechanism for preventing spurious signals from being detected as code markers. To achieve this end, the code markers are each of a predetermined minimum length, and a delay circuit in the code circuit mechanism prevents transmission of a code signal to the control circuit until a signal received by the code sensor indicates that the code signal is at least of said predetermined minimum length. In one aspect of the present invention, the delay circuit is a time delay circuit that prevents transmission of a code signal unless it exists for a predetermined period of time, the predetermined period of time representing the time it takes the vehicle to move said minimum distance at a given vehicle speed. In another aspect of the present invention the delay circuit is a distance delay circuit that prevents transmission of a code signal unless it is in continued existence while the vehicle moves the predetermined minimum distance along the guide line. The distance delay circuit can be controlled by means of a tachometer connected to the vehicle wheels.

Multiple operational controls can be incorporated by a second code marker placed a predetermined distance behind the first code marker. To achieve two separate controls, a second delay circuit is incorporated for preventing the transmission of the code signal until a second predetermined interval after the first code marker terminates. The control circuit includes a first control mechanism for actuating a first control function if no code marker signal is in existence at the end of the second predetermined interval and a second control mechanism for actuating a second control function if a code marker signal is present at the end of the second predetermined interval.

Desirably, the first control function is a temporary stop, wherein the vehicle is stopped for a predetermined period of time and then automatically started again. The second control function desirably is a permanent stop, wherein the vehicle is stopped permanently until restarted by manually actuating the control device.

These and other features and advantages of the present invention will hereinafter appear, and, for purposes of illustration, but not of limitation, a preferred embodiment of the present invention is described in detail below and shown in the appended drawings.

BRIEF DESCRIPTION OF THE DRAWINGS

FIG. 5 is a schematic diagram showing the time sequence operation of the binary counters of the time delay mechanism of the present invention.

FIG. 6 is a schematic circuit diagram showing the manner in which the code circuit of the present invention effects temporary and permanent stops of the vehicle.

FIG. 7 is a schematic diagram showing a portion of the guide line and code markers for temporary and permanent stops.

FIG. 8 is a schematic diagram of the code sensor output, showing the manner in which temporary and permanent stops are effected.

FIG. 9 is a schematic diagram showing a portion of a guide line employing four spaced code markers.

DETAILED DESCRIPTION OF PREFERRED EMBODIMENTS

Figure 1:
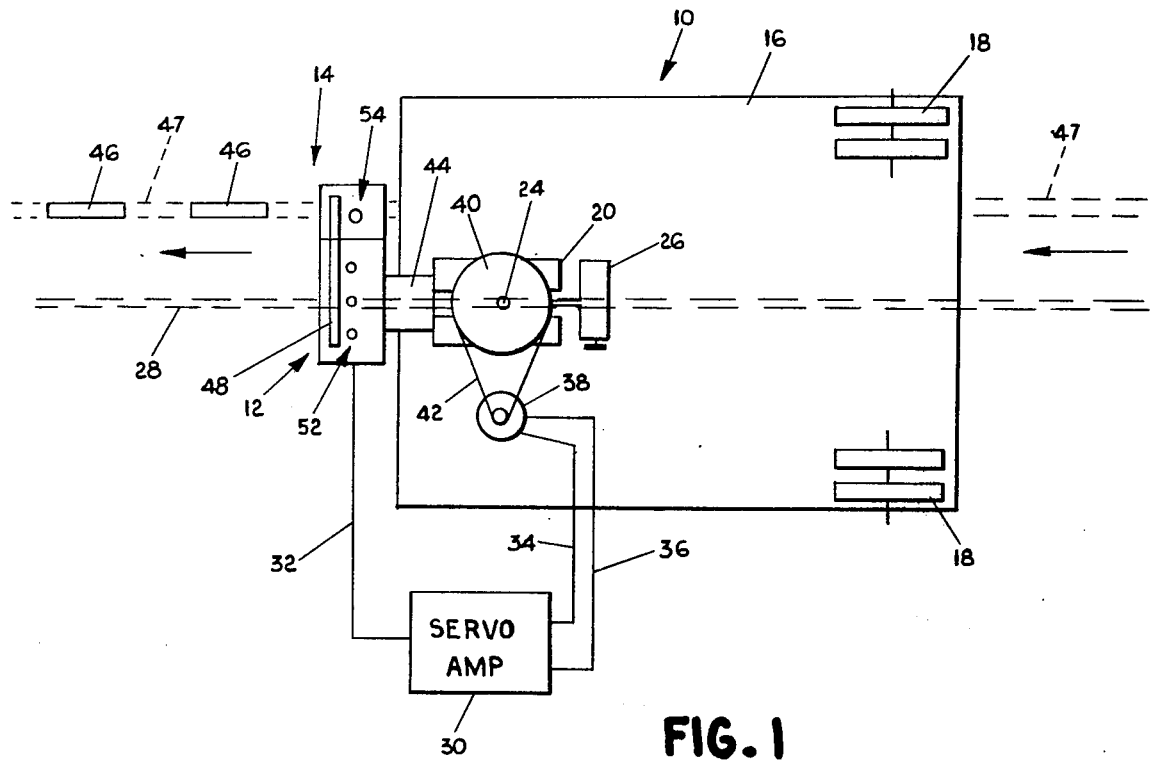
FIG. 1 is a schematic plan view of a vehicle employing a vehicle guidance mechanism and a code circuitry mechanism in accordance with the present invention.

Referring now to the drawings, a vehicle 10 employing a vehicle guidance mechanism 12 and a code circuit mechanism 14 constructed in accordance with the present invention is shown in FIG. 1. The preferred embodiment of the vehicle guidance mechanism is disclosed in the above-identified Related Applications, and the disclosures in those applications relative to the vehicle guidance mechanism itself are incorporated herein by reference. For convenience, the general features of this vehicle guidance mechanism will be described briefly herein, but reference should be made to the Related Applications for more complete description of this mechanism.

Vehicle 10 comprises a frame 16 riding on a pair of dual wheels 18 at the rear of the vehicle and a dual wheel 20 at the front of the vehicle. Dual wheel 20 is pivotally mounted about axis 24 for steering the vehicle. The vehicle is driven by a drive motor 26 of conventional design, which drives wheel 20 by a suitable chain drive mechanism or the like.

Automatic steering is provided by guidance mechanism 12, which senses the position of a guide line 28 and creates an error output signal proportional to the deviation of vehicle position from a center position over the guide line. The error output signal is transmitted to a servo amplifier 30 by means of a lead 32. Two leads 34 and 36 extend from the output of the servo amplifier to a reversible steering motor 38. Two leads are provided in order to turn the wheel in both directions. The steering motor is connected to pivotable wheel 20 by means of a suitable sprocket 40 and drive chain 42. Other types of drive trains could be employed as well.

As shown in the drawings, guide mechanism 12 is positioned directly over the guide line and is mounted to the pivotable wheel 20 for movement along with the wheel by means of a suitable frame 44 or the like. Rather than mounting the guide mechanism such that the wheel follows directly along the guide line, the guidance mechanism can be mounted slightly to the side of the wheel, so that the wheel does not roll over the guide line during the operation of the vehicle. This reduces wear on the guide line and prolongs the life of the guide line.

In the above-identified Related Applications, a suitable guide line for the vehicle guidance mechanism is disclosed. This guide line includes a suitable amount of fluorescent material, so that when the guide line is irradiated by ultraviolet light, the fluorescent material fluoresces so as to emit visible light in a predetermined frequency range. The preferred fluorescent material radiates visible light in the blue-green spectrum (approximately 450–500 nanometers when stimulated by invisible ultraviolet radiation at about 360 nanometers. A commonly available and well know fluorescent material known as "G.E. Green", available from The General Electric Company, is a suitable fluorescent material.

It is not necessary that the guide line be visible. Indeed with the fluorescent guidance system disclosed in the Related Applications, it is desirable that the guide line be substantially invisible under ambient lighting conditions (ambient lighting conditions being normal indoor lighting conditions wherein ultraviolet light is substantially absent from normal lighting).

The guide line can be applied to a floor, carpet, or any convenient surface in any conventional manner. While the manner of applying the guide line will vary depending upon the surface, a conventional procedure is to mix a quantity of fluorescent material with a suitable liquid carrier, such as alcohol, or the like, and apply the liquid material along the guide path desired.

The liquid material then evaporates, leaving the fluorescent material as a guide line. While the fluorescent material itself constitutes a faint white powder, when dispersed along a guide line, the material is substantially invisible. It is necessary to adjust the proportion of fluorescent material in the carrier (eg. by trial and error) for different types and colors of background materials in order to produce a guide line having sufficient brightness without being substantially visible under normal ambient lighting conditions.

The code circuitry of the present invention is actuated by a series of code markers 46 positioned alongside the guide line. Each code marker is positioned a predetermined distance from the guide line, such that the code markers are all aligned in a code marker path 47 that extends along the guide line. One or more code markers may be employed in combination in order to provide a variety of control functions for the vehicle guidance mechanism.

As described in detail below, the presence of a code marker in the code path is determined by a comparison of the signal received from the code path and the signal received from the guide line. It is therefore desirable that these signals be of the same nature and generally of the same intensity so that an accurate comparison is possible. Thus, the code markers preferably are formed of the same material and are applied in the same manner as the guide line. When employed in a vehicle guidance system of the type disclosed in the above-identified Related Applications, the guide line is formed of the same fluorescent material as the guide line itself.

Vehicle guidance mechanism 12 comprises a radiation source 48 in the form of an ultraviolet light for directing ultraviolet radiation on the guide line and code markers. An ultraviolet band pass filter 50 is employed with the ultraviolet light in order to eliminate any visible light that may be produced by the ultraviolet light.

Figure 2:
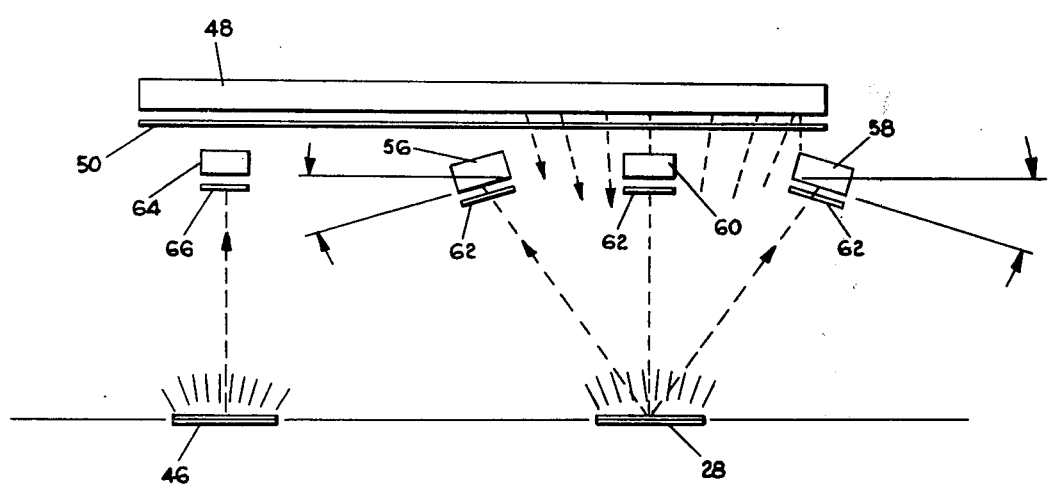
FIG. 2 is an elevational view showing in schematic form the guide line sensors and the code sensor of the present invention positioned over a guide line and a code marker.

The radiation source 48 directs ultraviolet light on both the guide line and code marker simultaneously when the radiation source is positioned over the code marker (as shown in FIG. 2). This radiation stimulates the fluorescent materials in the guide line and the code marker to emit visible radiation. The visible radiation emitted from the guide line is transmitted to guidance sensor circuitry 52 for steering the vehicle along the guide line, and radiation emitted from the code marker is transmitted to code sensor circuitry 54 for controlling the operation of the vehicle as it moves along the guide line (eg., stopping and starting the vehicle).

The guidance sensor circuitry employed in the preferred practice of the present invention is the same as the guidance sensor circuitry disclosed in detail in the above-identified Related Application, and reference is made to those applications for a full description of these circuits.

This guidance sensor circuitry is adapted to sense the guidance signal and produce a differential error output signal representative of the deivation of the vehicle position from the guide line. This error output signal is transmitted to the servo amplifier by lead 32 in order to control the position of the vehicle in accordance with this error output signal.

Considering the structure of the guidance sensor circuits in more detail, the sensing unit includes a sensing mechanism capable of producing discreet output signals representative of the intensity of the radiation received at three separate positions, two positions being to the left and to the right of the guide line when the guide line is positioned below the sensor mechanism, and the third position preferably being a centerline position directly over the guide line. The three discreet output signals are produced by separate photocells, a left photocell 56, a right photocell 58, and a centerline photocell 60 mounted over the guide line. The left and right photocells are positioned an equal distance to each side of the centerline photocell. Preferably, the left and right photocells are spaced about two inches on each side of the centerline photocell and are inclined at an angle of about 15°-18° from a horizontal position. This ensures a broad and continuous viewing area for tracking the guide line. It also positions the photocells so that approximately the same amount of background illumination is received by each photocell when the guide line is positioned under the center line photocell. This feature is significant in the feedback circuit described below and described in more detail in the Related Applications.

The photocells employed in the preferred practice of the present invention are silicon solar cells, which are current producing photocells having a relatively fast time constant. Visible band pass filters 62 can be employed in order to prevent any reflected ultraviolet radiation from reaching the sensor photocells. Desirably, the photocells are selected to have a peak response in the frequency range of the light emitted by the fluorescent guide line.

The code sensor circuitry 54 includes the same type of components used in the sensor circuitry 12, so that directly comparably output signals can be produced for determining the presence of a code marker in the code path. Thus, the code circuitry employs a single code photocell 64 and visible band pass filter 66 of the same type employed for the guide line sensors. The position of the code sensor 64 with respect to the code marker is selected so as to be approximately the same as the position of centerline photocell 60 with respect to the guide line.

Figure 3:
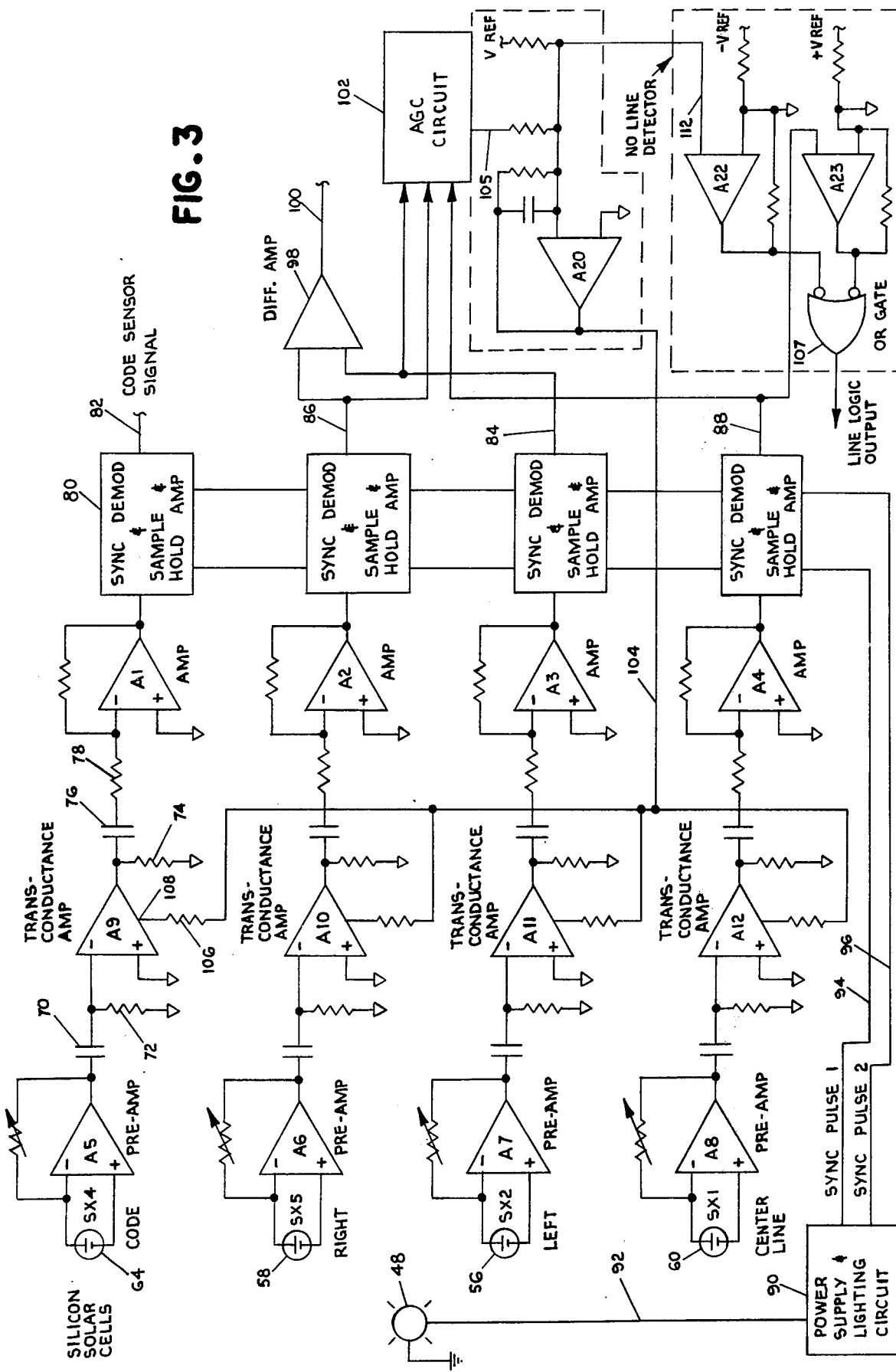
FIG. 3 is a schematic circuit diagram showing the sensor circuitry of the present invention.

The sensor circuitry of the present invention is disclosed in block diagram form in FIG. 3. Ultraviolet lamp 48 directs ultraviolet radiation on the guide line and the code marker path. Visible radiation received from the guide line and code marker path is received by silicon solar cells 56, 58, 60, and 64. The current output of these cells is amplified in preamplifiers A5-A8, which are gain adjustable to adjust for gain variations in the silicon solar cells. The outputs of these amplifiers then pass through coupling capacitors 70 and grounded input resistors 72 (the same components being employed for each amplifier) to transconductance amplifiers A9-A12, respectively. The output of each transconductance amplifier is connected to a grounded load resistor 74 and then passes through a coupling capacitor 76 and an input resistor 78. The signals are then fed through amplifiers A1-A4, the outputs of which are connected to synchronized demodulation and sample and hold amplifier circuits 80. These circuits are shown in block form only herein. Reference is made to the Related Applications for a detailed description of these circuits.

The output of the synchronized demodulation and sample and hold amplifier circuit for the code cell 64 appears at code signal output 82. The outputs of the synchronized demodulation and sample and hold amplifier circuits for the left, right, and centerline photocells appear at outputs 84, 86, and 88, respectively.

The synchronized demodulation and sample and hold amplifier circuits are included in the sensor circuitry as a part of a modulation circuit that eliminates static background illumination from the output signals of the sensor photocells. The function of this circuitry (which is described in detail in the Related Applications) is to modulate radiation produced by the ultraviolet light and then limit the output signal from the photocells to radiation received by the photocells at the modulated frequency. In order to achieve this effect, a power and lighting supply circuit 90 switches the ultraviolet light on and off at a frequency of 144 Hz through lead 92. At the same time, the power supply and lighting circuit generates synchronized pulses 1 and 2 through leads 94 and 96 and transmits these synchronized pulses to each of the synchronized demodulation and sample and hold amplifier circuits at the same time. The synchronized pulses cause the output of the amplifier to be sampled at two discreet time intervals representative of time when the light is on and off, and the sample and hold amplifier holds the difference between these signals as a constant DC output until such time as the difference between two signals changes. This circuitry is basically the same as the circuitry disclosed in the above-identified Related Applications with a couple of exceptions. First, in the power and lighting circuitry (shown in FIG. 10 of the Related Applications), the trigger pulse produced by multivibrator 113 is desirably 3.5 ms instead of 2.6 ms. Also, because the preferred practice of the present invention employs silicon solar cells having a fast time constant, each photocell output signal resembles a square wave instead of the output configuration depicted in FIG. 7b of the Related Applications. Thus, the strobe pulses are selected to sample the output signals at times when the radiation source is switched on and the radiation is switched off. In view of the fast time constant photocells, it is not necessary to sample the output signals just after the radiation source has been switched on and just before the radiation source is switched off, as is described in the Related Applications.

The output signals of the right and left photocells appearing in leads 84 and 86 are compared in a differential amplifier 98, and the output of this amplifier, appearing in lead 100, represents the error output signal that controls the steering of the vehicle. This circuitry is basically the same as the circuitry employed in the Related Applications.

The outputs of the left, right, and centerline photocells are connected to an AGC gain control circuit 102, which provides a feedback signal to the photocells through lead 104 in order to adjust the gain of the sensor output signals to compensate for variations in line brightness and to maintain a constant ratio between error output signal voltage and displacement of the vehicle from the guide line. The details of the feedback circuit of the present invention are disclosed in the Related Applications and reference is made to the circuit descriptions in those applications for more complete description of the AGC circuitry of the present invention.

As disclosed in the Related Applications, the AGC circuit is designed to maintain a constant difference between the centerline output signal and the average of the right and left output signals, with the centerline output signal being modified by adding to it the absolute value of the difference between the right and left output signals. The prescribed difference signal or error signal appears in lead 105 and is compared with a predetermined reference voltage at the input or summing junction of AGC amplifier A20, which is a high gain integrator. The output of amplifier A20 is the feedback signal, which is transmitted through lead 104 to a bias control resistor 106 attached to a bias control terminal 108 of each transconductance amplifier. The gain of each transconductance amplifier is a function of the current introduced at the bias control terminal, so the feedback signal provides a continuous gain adjustment of photocell output.

The sensor amplifiers and feedback terminals described herein are different from the circuitry described in the above-identified Related Applications. In a photoconductor, output gain can be adjusted by feedback to the sensor and its load resistor, but with a silicon solar cell the same mechanism cannot be employed so an adjustable amplifier is inserted.

Another element in the vehicle guidance mechanism is a line detection circuit 110 for preventing operation of the vehicle in the absence of a guide line of sufficient brightness. This line detection circuit can be substantially the same as the line detection circuit disclosed in FIG. 6 of the above-identified Related Applications and reference is made to those applications for a complete description of this circuit. Another version of this circuit is shown in FIG. 3.

The line detection circuit is triggered to indicate a no-line condition (thereby deactuating the automatic vehicle guidance control system) by a signal received from the AGC circuit through lead 112. This signal is compared with a reference voltage in level detector amplifier A22 and a no-line condition is produced when the input signal exceeds a predetermined level. This signal can be the AGC amplifier output signal (which is shown in FIG. 6 of the Related Applications as the output to high gain integrator amplifier A20) or it can be the signal present at the summing junction or input to amplifier, as shown in FIG. 3. In the former case, a no-line condition is indicated when amplifier A20 reaches a predetermined voltage indicative of the amplifier becoming saturated. Saturation occurs when the necessary contrast between the guide line and background cannot be maintained. In the case where the no-line signal is derived from the input to amplifier A20, the presence of an error signal greater than a predetermined amount at the input also indicates that the necessary contrast cannot be maintained and thus triggers a no-line signal from the line detection system. In the preferred practice of the present invention, a no-line signal is produced when the error signal at the input of AGC amplifier A20 is greater than −200 mv.

Actuating the no-line detection circuit by means of the input signal to amplifier A20, as opposed to the output signal of amplifier A20, has the advantage of producing a no-line indication even if the AGC circuit is rendered inoperative in a component failure or the like. When the output is used, a no-line signal is not produced if the AGC amplifier is inoperative, since the amplifier cannot be saturated.

Another feature of the line detector circuit of the present invention is that a separate level detector amplifier A23 monitors the centerline signal and prevents operation of the vehicle when the centerline signal exceeds a predetermined value (eg., 8.2V in the preferred practice). This indicates no-line or a line that is too dim because the voltage of the centerline signal is continually increased by the feedback circuit to maintain a constant difference between the centerline signal and average of the two side signals. When a line is not present or is too dim, the feedback signal will continue to increase the centerline signal to the point of saturation of the sensor circuit amplifiers. This triggers amplifier A23 and stops operation of the vehicle.

This circuitry is different from the Related Applications wherein dramatic "captures" of a guide line are prevented by a circuit that produces a no-line indication when the absolute value of the difference between the right and left photocell signals exceeds a predetermined level.

The no-line indications from amplifiers A22 and A23 are connected to a NOR gate 107, which transmits a no-line logic signal whenever a no-line indication is present at either input terminal.

Figure 4:
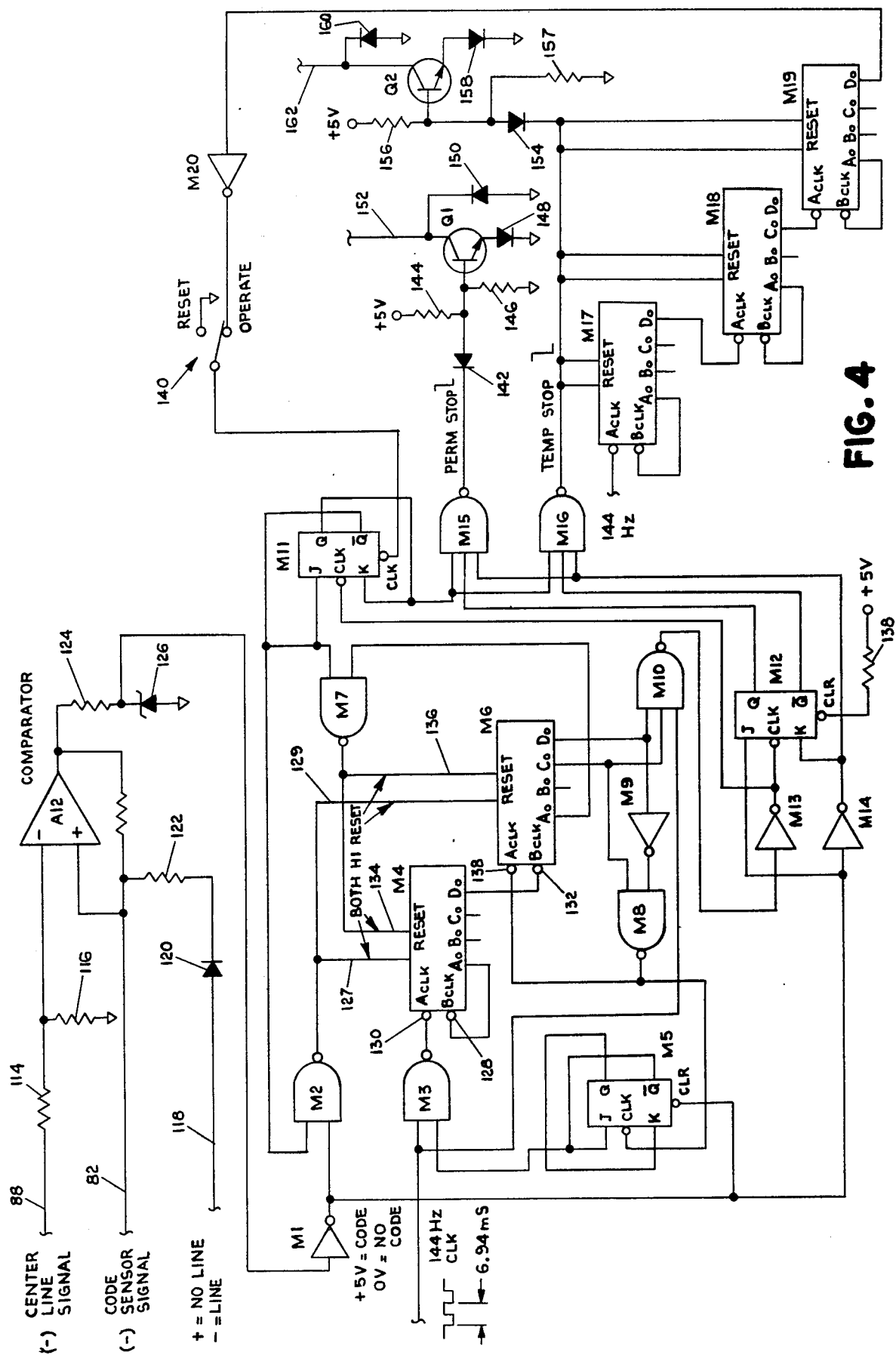
FIG. 4 is a schematic second diagram showing the code circuitry of the present invention.

The code circuitry of the present invention is shown in FIG. 4. The centerline voltage signal appearing in lead 88 is compared with the code sensor voltage signal appearing in lead 82 by means of a comparator amplifier A12. A voltage divider comprising resistors 114 and 116 reduces the apparent centerline voltage to amplifier A12 such that the amplifier will trip when the code voltage reaches about 70 percent of the centerline voltage. The amplifier will saturate in the negative direction when the code exceeds 70 percent of the center-line volatage and will saturate in the positive direction when the code voltage is less than 70 percent of the center-line voltage.

The no-line input appears in lead 118 through diode 120 and resistor 122 and is connected in parallel with the code sensor signal to the input of amplifier A12. A no-line input forces the amplifier to a "no code" position (i.e., positive saturation) when no guide line exists. This inhibits the operation of the code function when no guide line is present.

The output of comparator amplifier A12 is translated by resistor 124 and Zener diode 126 into voltages that are compatible with logic input. The plus and minus saturation voltages of the amplifier are translated to +5.1V and −0.7V, respectively.

The output voltage is then inverted by amplifier M1, such that the output of inverter M1 is approximately +5 volts (or high) when a code exists and approximately 0 volts (or low) when a code does not exist.

The output of inverter M1 is connected to NAND gate M2 (the output of which is low only when both inputs are high), and the output of NAND gate M2 is connected by leads 127 and 129 to the inputs of a 4 bit binary counter M4 and a 3 bit binary counter M6. The $A_0$ output of counter M4 is connected to input 128 (designated as "$B_{clk}$."), and input 130 of counter M4 (designated as "$A_{clk}$.") is connected to the output of NAND gate M3. Output $D_0$ of counter M4 is connected to input 132 of counter M6 (designated $B_{clk}$."). Output $A_0$ of counter M6 is connected to NAND gate M7, the output of which is connected inputs 134 and 136 of counters M4 and M6, respectively. The $C_0$ output of counter M6 is connected to the input of NAND gate M8 and to an input of NAND gate M10. The $D_0$ output of counter M6 is connected to another input of NAND gate M10 and to the input of an inverter M9. The output of inverter M9 is connected to the second input of NAND gate M3.

The output of NAND gate M8 is connected to the input terminal 138 (designated $A_{clk}$) of counter M6. The same output is connected to the "clock" input of master slave or flip-flop M5. The K input of flip-flop M5 is connected to the $\overline{Q}$ output of flip-flop M5. The J input of flip-flop M5 is connected to the Q output of flip-flop M5 and the input of NAND gate M3. The output of inverter M1 is connected to the "clear" input of flip-flop M5.

The logic of flip-flop M5 is as follows: if the Clear terminal is low, $\overline{Q}$ is high and Q is low. If the clear terminal is high, and J is high and K is low, Q is high and $\overline{Q}$ is low, when a clock pulse is received. If the clear terminal is high and J is low and K is high, Q is low and $\overline{Q}$ is high when a clock pulse is received.

As stated above, one input of NAND gate M3 is connected to input J of flip-flop M5. The other input of M3 is connected to a 144 Hz. clock, which represents a square wave signal. The time period for completion of each cycle of the square wave signal is 6.94 ms. The 144 Hz. clock signal presented at the inpt of NAND gate M3 also is connected to an input of NAND gate M10. The output of NAND gate M10 is connected to an inverter M13, the output of which is connected to the "Clock" input of flip-flop M12. The output of inverter M13 is also connected to the Clock input of flip-flop M11.

The J input of flip-flop M12 is connected to the input of an inverter M14, the same input also being connected to the output of inverter M1. The K input of flip-flop M12 is connected to the output of inverter M14, and this output leads to the inputs of NAND gates M15 and M16. The Q and $\overline{Q}$ outputs of flip-flop M12 are connected to the inputs of NAND gates M15 and M16, respectively. The Clear input of flip-flop M12 is connected through a resistor 138 to a +5 volt source.

With respect to flip-flop M11, the J input is connected to the $\overline{Q}$ output, as well as the input of NAND gate M7. The K input is connected to the Q output, as well as to the input of NAND gate M15. The same input is connected to the input of NAND gate M16. The $\overline{Q}$ output and J input are both connected to the input terminal of NAND gate M2. The Clear terminal of flip-flop M11 is connected to switch 140, which controls the operation of the code circuitry.

The output of NAND gate M15 is connected to a permanent stop circuitry represented by diode 142 leading to the base of transistor $Q_1$. The base of the transistor is biased by means of a voltage divider comprising resistors 144 and 146, connected to a +5V source. The emitter and collector terminals of transistor $Q_1$ are connected to ground through diodes 148 and 150. The output of the collector terminal is produced in lead 152, which is connected to the control circuitry shown in FIG. 6 to effect a permanent stop of the vehicle when a control signal is received.

The output of NAND gate M16 is connected to control circuitry for effecting a temporary stop of the vehicle and then restarting the vehicle after a predetermined period of time has elapsed. Output of NAND gate M16 is connected to the inputs of a plurality of interconnected counters M17, M18 and M19, which are driven by a 144 Hz. clock in the same manner as NAND gate M3. The $D_o$ output of counter M19 is connected to inverter M20 and then passes through switch 140 to the clear input of flip-flop of M11. The output of terminal of NAND gate 16 also is connected through a diode 154 to the base of a transistor $Q_2$. The base is biased by means of a voltage divider comprising resistors 156 and 157. which are connected to a +5V source. The emitter and collector junctions of transistor $Q_2$ are connected to grounded diodes 158 and 160 respectively, and the output of the transistor appears at lead 162 leading from the output of the collector.

Having described the circuit connections of the code circuitry, the operation of this circuitry is as follows.

When power is first applied and switch 140 is moved from the reset to the operate position, the following are the output levels when no code is present:

| | |
|---|---|
| M1 | Low |
| M2 | High |
| M11 (Q) | Low |
| M7 | High |
| M4 & M6 | Reset & all outputs Low |
| M5 (Q) | Low |
| M3 | Clocking at 144 Hz. |
| M8 | High |
| M10 | High |
| M13 | Low |
| M14 | High |
| M12 (Q) | Undetermined |
| M15 | High |
| M16 | High |
| $Q_1$ | On |
| $Q_2$ | On |
| M17, M18, M19 | Reset & all outputs low |

This state continues to exist as long as no code is present.

When a code sign is present, inverter M1 goes high. This causes the output of NAND gate M2 to go low, and this in turn causes counters M4 and M6 to begin to count. These counters continue to count until the $C_o$ output of counter M6 goes high. At this point NAND gate M8 goes low and toggles flip-flop M5, which then inhibits the clock from transferring through NAND gate M3. NAND gate M8 also toggles the $A_o$ flip-flop in counter M6, making the output of NAND gate M7 low. This would allow the counters M4 and M6 to continue to count if a clock were present at the output of NAND gate M3. Nothing more happens until the code input goes low.

As shown in FIG. 5, the code input must exist for 224 ms. minimum for the sequence to take place. If the code is not present for the 224 ms. duration, the output of NAND gate M7 does not go low, so when the output of NAND gate M2 goes high at the end of a signal, counters M4 and M6 are reset, requiring the entire count to start from zero again.

When the code at the output of NAND gate M1 does go low again, flip-flop M5 is cleared and allows the clock once again to be transferred through NAND gate M3. Counters M4 and M6 now continue to count until $C_o$ and $D_o$ outputs of counter M6 go high, which occurs 448 ms. after the code has gone low. when the next clock pulse at M3 goes high, NAND gate M10 goes low and the output of inverter M13 goes high. When this clock pulse at NAND gate M3 goes low, NAND gate M10 goes high and inverter M13 goes low. It is this clock pulse at inverter M13 that sets flip-flop M11 and M12. Setting M11 forces the output of NAND gates M2 and M7 high, resetting counters M4 and M6 and thereby inhibiting further counting from taking place.

The action of setting flip-flop M12 determines whether temporary stop or a permanent stop exists. If at the time M12 is set a code exists, the input at the J terminal will be high and the K input low (because of inverter M14). This means that flip flop M12 will be set with the $\overline{Q}$ output high and a Q output low. As will be described below this signifies a permanent stop.

If at the time flip-flop M12 is set no code exists, the J input will be low and the K input high. This means that flip flop M12 will be set with Q low and the $\bar{Q}$ high. This signifies a temporary stop.

For a temporary stop, the output of NAND gate M16 will switch to low immediately because the output of inverter M14 is high. For a permanent stop, the output of NAND gate M15 will not go to low to initiate a permanent stop until the code goes low (i.e., inverter M14 goes high).

In summary, for a temporary stop, a code must exist for a minimum of 224 ms. (in this example) and then no code must exist 448 ms. after the code goes low. For a permanent stop, a code must exist for a minimum of 244 ms. and then again 448 ms. after once having gone low. This permanent stop output will not be initiated, however, until the code again goes low after the 448 ms. set of flip-flop M12.

The code markings necessary to produce permanent and temporary stops are shown in FIG. 7, and a diagram of code magnitude and duration representative of these code marker positions is shown in FIG. 8.

When a permanent stop exists at the output of NAND gate M15, (i.e., when the output of NAND gate M15 goes low), transistor $Q_1$ will be turned off, effectively creating an open circuit in lead 152. As described below with respect to FIG. 6, this will unlatch the automatic mode of the vehicle guidance mechanism and stop the vehicle until such time as the automatic mode is manually reactuated.

When a temporary stop exists at the output of NAND gate M16, the transistor $Q_2$ will turn off, thus creating effectively an open circuit in lead 162. This will disconnect the traverse motor of the system in the manner described below. At the same time, counters M17, M18 and M19 will begin to count. At the desired count (or time delay) the $D_o$ output of counter M19 will go high and the output of inverter M20 will go low, setting flip-flop M11. This returns the output of NAND gate M16 to the high state and allows transistor $Q_2$ to turn on again. This switches the traverse motor back on for continuing operation of the vehicle.

The time delay illustrated by counters M17, M18, and M19 is 14.3 seconds in the disclosed example. Any time delay is possible by decreasing the input frequency to counter M17, or by adding more counters.

Also, the input to NAND gate M3 need not be the 144 Hz. pulse signal illustrated in FIG. 4. It could also be an input from a conventional tachometer attached to the traverse wheel of the vehicle. This would then translate the time function used in this description directly into distance. When a time function is used, the time function must be correlated to distance by reference to the speed of the vehicle. A tachometer attached to the vehicle would provide a direct distance input to the logic circuitry, regardless of vehicle speed.

Additionally, the coding information need not be limited to two bits of information. Additional code markers can be employed to obtain a number of instructions. For example, as shown in FIG. 9, four code markers are shown. The output of the code detector could be represented by the binary number 10101010, which then could be compared to an instruction stored in a memory to perform a variety of commands.

The manner in which temporary and permanent stops are effected by the code circuitry of the present invention is shown in FIG. 6. The code detector circuit in FIG. 6 is represented in block form by element 164. The clock pulse is provided to the code detector circuit by means of clock 166, which may either be the 144 Hz. clock described above, or it may be a clock signal provided by a conventional tachometer. Other inputs provided to the code detector circuit are received from sensor and line detector circuit 166 in the form of no-line, center line, and code signals. The no-line signal also is transmitted to stop relays 168. The sensor and line detector circuit also transmits an error control signal to steering control 170 for controlling the steering of the vehicle along the guide line. The foregoing elements disclosed in block form are described and shown in detail in FIG. 9 of the above identified Related Applications, and reference is made to these applications for a more complete description of these elements of these circuits.

Traverse motor 172 is energized by a 36V source appearing at input terminal 174 of switch 176. When switch 176 is closed, the 36V are applied to the motor control circuit 178 by means of lead 180 in order to actuate the traverse motor. The motor control circuit includes the several circuit elements disclosed in FIG. 9 of the above-identified Related Applications. Switch 176 is connected for simultaneous actuation with a second switch 182, the input of which is connected to permanent stop lead 152. Both switches are actuated by means of a self-latching relay 184. One terminal of relay 184 is connected to a 36V source through stop relays 168, which can include relays for de-actuating the mechanism in the presence of no line, no light, or an obstacle, as described in the Related Applications. The other terminal of relay 184 is connected to ground through automatic mode contacts 186, which are momentary contacts, through lead 187. A lead 188 also extends from the closed position terminal of switch 182 to lead 187.

When the momentary contacts of automatic mode switch 186 are closed, relay 184 is momentarily energized. This closes switches 176 and 182. Lead 152 is effectively grounded when permanent stop transistor $Q_1$ is conducting, so relay 184 becomes self-latching through lead 188, switch 182 and lead 152, even though the momentary contacts of switch 186 become disengaged. Switch 176 thus remains closed as long as relay 184 remains energized. Relay 184 becomes de-energized whenever any of the stop relays are actuated or whenever transistor $Q_1$ is rendered non-conducting. As described above, this occurs when a permanent stop signal is indicated by the presence of a first code marker for 224 ms. followed by a second code marker in existence 448 ms. after the first code marker terminates. When the second code marker signal terminates $Q_1$ is rendered non-conducting, thus de-energizing relay 184 and opening switch 176. This switch remains open until reactuated by manually depressing automatic mode switch 186. Thus, the stop is permanent.

Temporary stop lead 162 is connected to one terminal of a temporary stop relay 190, the other terminal of which is connected to a 36V source. When actuated, relay 190 closes a switch 192 in lead 180 and permits traverse motor 172 to be energized. Relay 190 remains energized as long as transistor $Q_2$ in the temporary stop control circuitry is conducting. As soon as transistor $Q_2$ is rendered non-conducting relay 190 is de-energized, opening switch 192 and temporarily deactuating traverse motor 172. After the predetermined period of time provided for by counters M17, M18, and M19 has elapsed, transistor $Q_2$ is again rendered conducting, thereby re-energizing relay 190, closing switch 192, and reactuating the traverse motor.

It should be understood that the foregoing embodiments of the present invention are merely exemplary of the preferred practice of the present invention, and that various changes and modifications may be made in the arrangements and details of construction of the embodiments described herein without departing from the spirit and scope of the present invention.

The embodiments of the invention in which an exclusive property or privilege is claimed are defined as follows:

1. In a vehicle guidance mechanism for guiding a vehicle along a guide line by means of guide line radiation received from the guide line, code circuit means for automatically controlling the operation of the vehicle along the guide line comprising:

code marker means positioned alongside the guide line at predetermined positions along the guide line where control functions are desired, the code marker means being positioned in a code marker path alongside the guide line, the code marker means being formed such that code marker radiation representing a code marker signal is transmitted from the code marker means at least at a specified time when the vehicle is in position to sense said marker radiation, the intensity of the code marker radiation having a predetermined relationship to the intensity of the radiation from the guide line adjacent to it;

sensor circuit means in the vehicle for sensing and continuously comparing the intensity of radiation received from the code marker path and guide line as the vehicle moves along the guide line and generating a code signal when the intensity of the radiation from the code marker path increases to a predetermined proportion of the intensity of the guide line radiation that is indicative of the presence of a code marker in the code marker path; and control means for controlling the operation of the vehicle in a predetermined manner in response to code signals generated by the sensor circuit means.

2. Code circuit means according to claim 1 and further comprising feedback means for continuously adjusting the gain of the sensor circuit means to compensate for variations in guide line brightness, the feedback means increasing sensor circuit means gain when line brightness is low and decreasing sensor circuit means gain in the presence of a bright guide line, the feedback means adjusting the gain response of the sensor circuit means to radiation from the code marker path in the same manner as the gain response with respect to radiation from the guide line is adjusted.

3. Code circuitry means according to claim 2 wherein the sensor means comprises:

code sensor means for sensing radiation received from the code marker path and generating a code sensor output signal representative of the intensity of said code marker path radiation;

guide line sensor means for sensing radiation received from the guide line and generating a guide line sensor output signal representative of the intensity of said guide line radiation;

comparator means for comparing the code sensor and guide line sensor output signals, said comparator means generating a code signal indicative of the presence of a code marker in the code marker path whenever the code sensor output signal increases to a predetermined percentage of the guide line sensor output signal; and the feedback means adjusts the gain of the code sensor means and guide line sensor means in accordance with variations in the intensity of radiation received from the guide line.

4. Code circuitry according to claim 3 wherein the guide line sensor means includes sensor means for producing discreet output signals representative of guide line radiation intensity at at least three positions relative to the guide line, two positions being to the left and right of the guide line and the third position being between the left and right positions, the guide line sensor output signal compared with the code sensor output signal being the output signal for the third position, the feedback signal being such that it maintains a constant difference between the third position output signal and the average of the left and right positions output signals at least when the guide line is centered with respect to the sensor means and the intensity of the guide line radiation is greater than the intensity of the background radiation received by the sensor means.

5. Code circuitry according to claim 4 wherein the third position output signal employed in the feedback means is modified by adding to it the absolute value of the difference between the output signals from the left and right positions.

6. Code circuitry according to claim 1 wherein each code marker means is of a predetermined minimum length and the sensor circuit means includes delay circuit means for preventing transmission of any code signal to the control means that is representative of any radiation source in the code path that is not at least of said predetermined minimum length.

7. Code circuitry according to claim 6 wherein the delay circuit means is a time delay circuit means for preventing transmission of a code signal to the control means unless the code signal exists for a predetermined period of time, said period of time representing the time it takes the vehicle to move said predetermined minimum distance at a given vehicle speed.

8. Code circuitry according to claim 6 wherein the delay circuit means is a distance delay circuit means for preventing the transmission of a code signal to the control means unless the code signal remains in existence while the vehicle moves said predetermined minimum distance along the guide line.

9. Code circuitry according to claim 6 and further comprising:

second delay circuit means for preventing the transmission of a code signal to the control means for a predetermined interval after the sensor circuit means ceases to receive a code marker signal indicative of the presence of a code marker means in the code path; and the control means comprises first control means for actuating a first control function if no code marker signal is being received by the sensor circuit means at the end of said second predetermined interval and a second control means for actuating a second control function if a new code marker signal is being received by the sensor circuit means at the end of said second predetermined interval.

10. Code circuitry according to claim 9 wherein:
   the first control means is a temporary stop means for stopping the vehicle for a predetermined period of time when a single code marker means is present at a particular location in the code marker path, the first control means restarting the vehicle automatically after said predetermined period; and the second control means is a permanent stop means for stopping the vehicle permanently when two code marker means are present in succession in the code marker path and are positioned apart from each other such that the radiation from the second code marker means is being received by the sensor circuit means at the end of said second predetermined interval, the vehicle being reactuable by a manually actuatable switch after it has been stopped permanently by said permanent stop means.

11. Code system means according to claim 10 wherein:

the vehicle is operated by an electric motor;

one lead to the electric motor includes a self-latching relay switch actuated by a momentarily depressable automatic mode switch, the second control means deactuating the self-latching relay switch when a permanent stop signal is received, the reactuation of the self-latching relay requiring the manual actuation of the automatic mode switch; and the first control means includes a first relay switch means in a lead for the motor for disconnecting the motor when a temporary stop signal is received, the first relay switch remaining deactuated until the predetermined time for the temporary stop has elasped and then being reactuated automatically to reactuate the motor.

12. Code circuitry according to claim 1 wherein:

the guide line and code marker means include fluorescent material and are substantially invisible in the absence of ultraviolet light, said guide line and code marker means emitting radiation at least principally in the form of visible light when stimulated by ultraviolet radiation;

the vehicle includes radiation means for directing ultraviolet radiation on the guide line and code marker path as the vehicle follows the guide line;

the sensor circuit means is responsive to visible light received from the guide line and code marker path for guiding and controlling the operation of the vehicle along the guide line; and the vehicle guidance mechanism includes modulation circuit means for eliminating the effects of static background illumination on code circuitry means and vehicle guidance means performance, said modulation circuit means including modulation means for modulating the radiation produced by the radiation means at a predetermined frequency and synchronized demodulation means for limiting the response of said sensor circuit means to radiation modulated at said predetermined frequency.

13. Code circuit means for automatically controlling the operation of a vehicle along a predetermined guide path comprising:

at least one code marker of a predetermined length positioned adjacent the guide path, said code marker transmitting a code marker signal indicative of the position of the code marker;

code sensor means mounted in the vehicle so as to receive the code marker signal from the code marker as the sensor means passes the code marker, the code marker signal being received for a period of time representative of the time it takes for the sensor means to pass the code marker, said code sensor means generating a code signal at an output thereof while the code marker signal is being sensed;

delay circuit means connected to the output of the code sensor means, said delay circuit means blocking the transmission of said code signal unless the duration of the code signal is sufficient to indicate the presence of a code marker of at least said predetermined length at least when the vehicle is traveling at a predetermined speed past the code marker; and control circuit means responsive to said code signal for controlling the operation of the vehicle in a predetermined manner.

14. Code circuitry according to claim 13 wherein the delay circuit means is a time delay circuit means for preventing transmission of a code signal to the control means unless the code signal exists for a predetermined period of time, said period of time representing the time it takes the vehicle to move said predetermined minimum distance at a given vehicle speed.

15. Code circuitry according to claim 13 wherein the delay circuit means is a distance delay circuit means for preventing the transmission of a code signal to the control means unless the code signal remains in existence while the vehicle moves said predetermined minimum distance along the guide line.

16. Code circuit means according to claim 13 wherein the control circuit means stops the vehicle when an operational control signal is received.

17. Code circuit means according to claim 16 wherein;

a second code marker of predetermined length is spaced a selected longitudinal distance away from the one code marker; and the code circuit means include second delay circuit means for preventing transmission of the code signal to the control means until a predetermined interval after the code sensor means has passed the one code marker, said control means including first control means for stopping the vehicle temporarily for a predetermined period of time if no code marker signal is being received by the code sensor means at the time the second predetermined interval is over, said control means including a second control means for permanently stopping the vehicle if a second control signal is being received by the sensor means when the second predetermined interval is over, the vehicle thereafter requiring manual actuation to re-commence automatic movement of the vehicle along the guide line.

18. Code system means according to claim 17 wherein:

the vehicle is operated by an electric motor;

one lead to the electric motor includes a self-latching relay switch actuated by a momentarily depressable automatic mode switch, the second control means deactuating the self-latching relay switch when a permanent stop signal is received, the reactuation of the self-latching relay requiring the manual actuation of the automatic made switch; and the first control means includes a first relay switch means in a lead for the motor for disconnecting the motor when a temporary stop signal is received, the first relay switch remaining deactuated until the predetermined time for the temporary stop has elasped and then being reactuated automatically to reactuate the motor.

* * * * *